US010414248B2

(12) United States Patent
Ito et al.

(10) Patent No.: US 10,414,248 B2
(45) Date of Patent: Sep. 17, 2019

(54) HUMIDIFICATION DEVICE

(71) Applicant: DENSO CORPORATION, Kariya, Aichi-pref. (JP)

(72) Inventors: Koji Ito, Kariya (JP); Yasuhiko Niimi, Kariya (JP); Jun Yamaoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 385 days.

(21) Appl. No.: 15/303,892

(22) PCT Filed: Apr. 24, 2015

(86) PCT No.: PCT/JP2015/002249
§ 371 (c)(1),
(2) Date: Oct. 13, 2016

(87) PCT Pub. No.: WO2015/177968
PCT Pub. Date: Nov. 26, 2015

(65) Prior Publication Data
US 2017/0036517 A1    Feb. 9, 2017

(30) Foreign Application Priority Data

May 21, 2014   (JP) ................................. 2014-105375

(51) Int. Cl.
*B60H 3/02*     (2006.01)
*F24F 3/14*     (2006.01)
*B60H 1/32*     (2006.01)

(52) U.S. Cl.
CPC .............. *B60H 3/02* (2013.01); *F24F 3/1411* (2013.01); *B60H 1/3207* (2013.01);
(Continued)

(58) Field of Classification Search
CPC .. B60H 3/02; B60H 2003/028; B60H 1/3207; F24F 2203/02; F24F 3/1411
See application file for complete search history.

(56) References Cited

U.S. PATENT DOCUMENTS

| | | | |
|---|---|---|---|
| 5,873,256 A * | 2/1999 | Denniston | B60H 1/00414 62/244 |
| 2010/0028214 A1* | 2/2010 | Howard | A01N 1/0252 422/400 |

(Continued)

FOREIGN PATENT DOCUMENTS

| | | | |
|---|---|---|---|
| JP | 2005282992 A | 10/2005 | |
| JP | 2006306293 A | 11/2006 | |

(Continued)

*Primary Examiner* — David J Teitelbaum
(74) *Attorney, Agent, or Firm* — Harness, Dickey & Pierce, P.L.C.

(57) ABSTRACT

A humidification device is used in a vehicle air conditioner having a cooler disposed in an air conditioning case. The air conditioning case has a ventilation path leading air into a vehicle compartment. The humidification device has an adsorber that absorbs and desorbs moisture, a blower, a door that opens or closes an air flow path, and a controller. The controller switches the air flow path by controlling the door to set (i) a dehumidification mode in which air cooled by the cooler is led to the adsorber, and moisture in the air is adsorbed by the adsorber or (ii) a humidification mode in which air is led to the adsorber, the moisture is moved from the adsorber to the air to humidify the air, and the humidified air is blown toward an occupant.

13 Claims, 5 Drawing Sheets

(52) U.S. Cl.
CPC .... *B60H 2003/028* (2013.01); *F24F 2203/02* (2013.01); *F24F 2221/38* (2013.01)

(56) References Cited

U.S. PATENT DOCUMENTS

2013/0240173 A1\* 9/2013 Line ................. B60H 1/241
 165/41
2016/0054013 A1 2/2016 Komatsubara

FOREIGN PATENT DOCUMENTS

| JP | 2013244773 A | 12/2013 |
|----|--------------|---------|
| JP | 2014202426 A | 10/2014 |

\* cited by examiner

HUMIDIFICATION DEVICE

CROSS REFERENCE TO RELATED APPLICATIONS

This application is a U.S. National Phase Application under 35 U.S.C. 371 of International Application No. PCT/JP2015/002249 filed on Apr. 24, 2015 and published in Japanese as WO 2015/177968 A1 on Nov. 26, 2015. This application is based on and claims the benefit of priority from Japanese Patent Application No. 2014-105375 filed on May 21, 2014, The entire disclosures of all of the above applications are incorporated herein by reference.

TECHNICAL FIELD

The present disclosure relates to a humidification device used in combination with a vehicle air conditioner.

BACKGROUND ART

Conventionally, as this type of humidification device, there is a device disclosed in Patent Literature 1, for example. In the humidification device described in Patent Literature 1, moisture permeable tubes that vaporize water are disposed just in front of blow outlets through which air is blown into a vehicle compartment, and the water is supplied from a water supply tank to the moisture permeable tubes to thereby humidify conditioned air.

However, according to studies by the inventors of the present disclosure, water for humidification needs to be resupplied into the water supply tank in the prior-art humidification device.

PRIOR ART LITERATURES

Patent Literature

Patent Literature 1: JP 2005-282992 A

SUMMARY OF INVENTION

With the above point in view, an object of the present disclosure is to provide a humidification device which can perform humidification without water supply by utilizing a vehicle air conditioner.

A humidification device is used for a vehicle air conditioner having a cooler that is disposed in an air conditioning case and cools air. The air conditioning case has a ventilation path leading air into a vehicle compartment. The humidification device has an adsorber that absorbs and desorbs moisture, a blower that causes air to flow through the adsorber, a door that opens or closes an air flow path through which the air flows, and a controller. The controller switches the air flow path by controlling the door to set (i) a dehumidification mode in which the air cooled by the cooler is led to the adsorber, and moisture in the air is adsorbed by the adsorber or (ii) a humidification mode in which the air is led to the adsorber, the moisture is moved from the adsorber to the air to humidify the air, and the humidified air is blown toward an occupant.

According to the above features, the moisture is adsorbed by the adsorber from the high-humidity air cooled by the cooler of the vehicle air conditioner, and the moisture adsorbed by the adsorber is moved to the low-humidity air to humidify the air. Therefore, humidification can be carried out without water supply.

DESCRIPTION OF EMBODIMENTS

One embodiment of the present disclosure will be described hereinafter.

Figure 1:
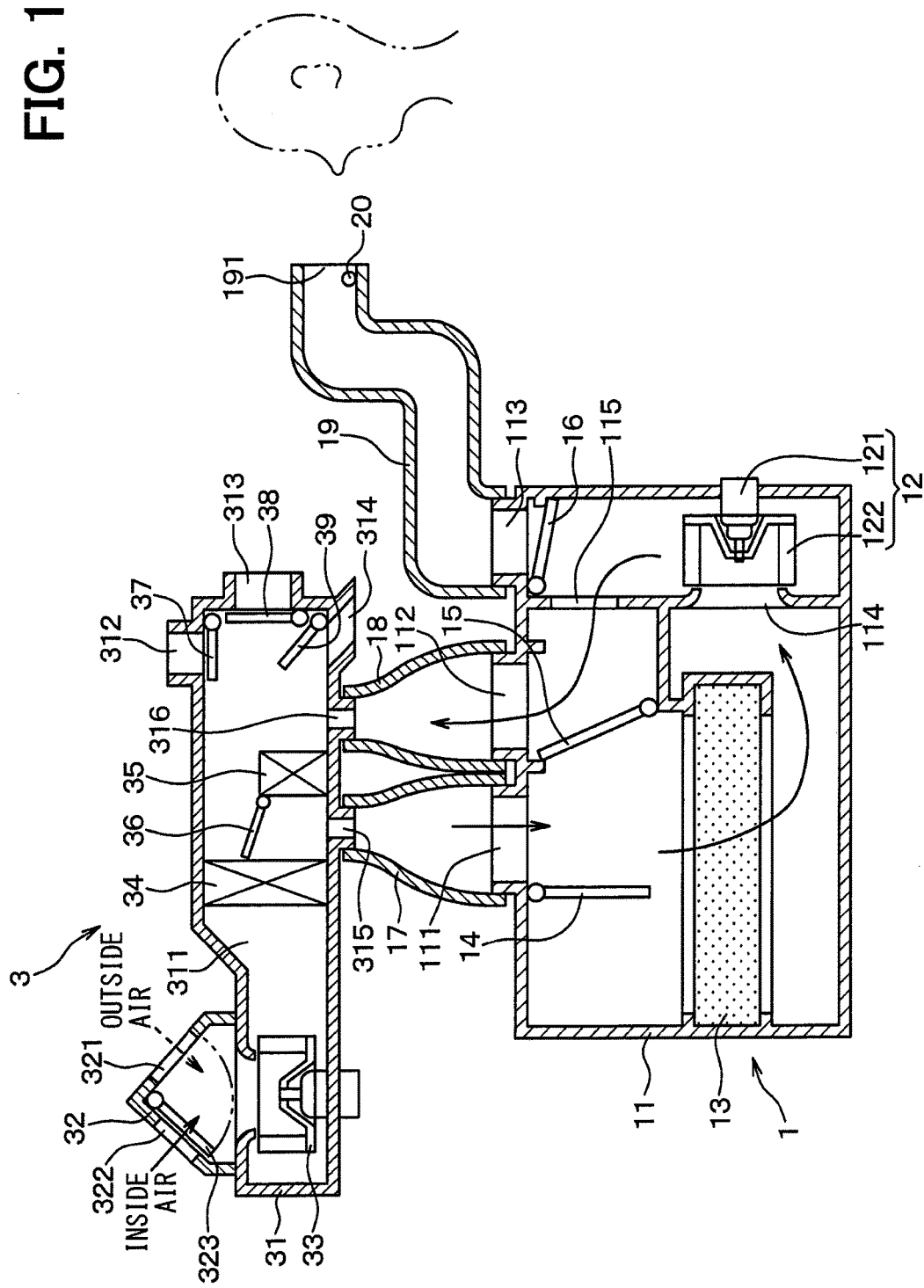
FIG. 1 is a schematic diagram illustrating structures of a humidification device according to an embodiment and a vehicle air conditioner, and shows an example of an operation of a dehumidification mode of the humidification device.

As shown in FIG. 1, a humidification device 1 according to the present embodiment is used in combination with a vehicle air conditioner that carries out air conditioning in a vehicle compartment.

An interior air conditioning unit 3 of the vehicle air conditioner is disposed below an instrument panel in the vehicle compartment.

The interior air conditioning unit 3 includes an air conditioning case 31 forming a ventilation path 311 that leads air into the vehicle compartment. An inside/outside air switching box 32 is disposed on a most upstream side in an air flow direction of the air conditioning case 31. The inside/outside air switching box 32 has an outside air introducing port 321 that introduces outside air and an inside air introducing port 322 that introduces inside air is disposed. An inside/outside air switching door 323 is rotatably disposed inside the inside/outside air switching box 32.

The inside/outside air switching door 323 is disposed in a branch area from which the outside air introducing port 321 and the inside air introducing port 322 are branched. The inside/outside air switching door 323 is driven by an actuator (not shown) to switch between the inside air and the outside air to be introduced into the ventilation path 311 in the air conditioning case 31 or adjust a mixing ratio between the inside air and the outside air.

In the ventilation path 311, an air conditioner blower 33, an evaporator 34 as a cooler, a heater core 35 as a heater, and doors 36 to 39 are disposed.

The air conditioner blower 33 draws air into the inside/outside air switching box 32 and blows the air to a downstream side in the air conditioning case 31. The air conditioner blower 33 has a motor and a centrifugal blower fan connected to a rotating shaft of the motor.

The evaporator 34 is disposed on a downstream side of the air conditioner blower 33 in the air flow direction and connected to a compressor or the like, which is driven by a vehicle engine (not shown), to form a refrigeration cycle. In the evaporator 34, low-pressure refrigerant flowing through the evaporator 34 absorbs heat from the air flowing through the ventilation path 311 and evaporates to thereby cool the air.

The heater core 35 is disposed on a downstream side of the evaporator 34 in the air flow direction, and cooling water (i.e., warm water) for the vehicle engine (not shown) circulates in the heater core 35. The heater core 35 heats the air flowing through the ventilation path 311 by using the engine cooling water as a heat source.

The air mix door 36 is rotatably provided between the evaporator 34 and the heater core 35. The air mix door 36 is driven by an actuator (not shown) to adjust a ratio between the air passing through the heater core 35 and the air bypassing the heater core 35. In this way, a temperature of the air blown into the vehicle compartment is adjusted.

A defroster blow outlet 312 that blows the air toward a vehicle windshield, a face blow outlet 313 that blows the air toward an occupant's upper body, and a foot blow outlet 314 that blows the air toward an occupant's feet are formed in a most downstream portion of the air conditioning case 31 in the air flow direction.

The defroster door 37 opens or closes the defroster blow outlet 312, the face door 38 opens or closes the face blow outlet 313, and the foot door 39 opens or closes the foot blow outlet 314.

The doors 37 to 39 are driven by the actuator (not shown) to open or close the respective blow outlets 312 to 314 to thereby set respective blowing modes. The blowing modes include a face mode, a bi-level mode, a foot mode, a foot-defroster mode, and a defroster mode, for example. The air of which temperature is conditioned is blown into the vehicle compartment through the blow outlet which is open according to the blow mode.

The air conditioning case 31 has an evaporator downstream opening portion 315 and a heater core downstream opening portion 316. that the evaporator downstream opening portion 315 is positioned between the evaporator 34 and the heater core 35, and the ventilation path 311 and an outside communicate with each other through the evaporator downstream opening portion 315. The heater core downstream opening portion 316 is positioned on a downstream side of the heater core 35, and the ventilation path 311 and the outside communicate with each other through the heater core downstream opening portion 316. Hereinafter, the evaporator downstream opening portion 315 and the heater core downstream opening portion 316 will be referred to as a first opening portion 315 of the air conditioning case 31 and a second opening portion 316 of the air conditioning case 31, respectively.

The humidification device 1 is disposed below the instrument panel. More specifically, the humidification device 1 is disposed near the evaporator 34 and in an area in which the first opening portion 315 of the air conditioning case 31 and a first opening portion 111 of a humidification device case 11 (described later) are adjacent to each other.

The humidification device 1 includes the humidification device case 11 that is made of resin and forms a ventilation path through which the air flows, and a humidification device blower 12, an adsorber 13, and doors 14 to 16 are disposed in the humidification device case 11. The humidification device 1 includes ducts 17 to 19 and a temperature sensor 20.

The humidification device case 11 is provided with opening portions 111 to 113, a suction port 114, and a communication hole 115. An inside of the humidification device case 11 and the outside communicate with each other through the opening portions 111 to 113. The suction port 114 provides as an inlet portion of the air into the humidification device blower 12. A downstream side of the humidification device blower 12 in an air flow direction and the second opening portion 112 communicate with each other through the communication hole 115.

The first opening portion 111 is connected to the first opening portion 315 of the air conditioning case 31 by the first duct 17 to guide the air cooled by the evaporator 34 into the humidification device case 11. The air introduced into the humidification device case 11 is led to the adsorber 13. The opening/closing door 14 is rotatably mounted to the humidification device case 11 and opens or closes the first opening portion 111.

The second opening portion 112 is connected to the second opening portion 316 of the air conditioning case 31 by the second duct 18. The second opening portion 112 communicates with a downstream side in the air flow direction of the ventilation path extending from the first opening portion 111 to the adsorber 13 or with the communication hole 115, depending on a turning position of the first switching door 15 that is rotatably mounted to the humidification device case 11.

The third duct 19 is connected to the third opening portion 113. The third duct 19 has a blow opening portion 191, which is a downstream end in the air flow direction and disposed at an upper portion of the instrument panel. The third duct 19 blows out the air humidified by the humidification device 1 from the blow opening portion 191 toward an occupant's face (i.e., a mouth, a nose, eyes). The temperature sensor 20 that detects the temperature of the air blown out of the third duct 19 is disposed in the third duct 19 to be adjacent to the blow opening portion 191. The second switching door 16 is rotatably mounted to the humidification device case 11 and opens or closes the third opening portion 113 and the communication hole 115.

As a material of the ducts 17 to 19, polypropylene (PP), polyethylene terephthalate (PET), or the like may be employed. A wall of the third duct 19 is preferably as thin as possible in order to facilitate heat exchange between the air in the third duct 19 and air outside the duct 19.

The humidification device blower 12 draws the air from the first opening portion 111 or the second opening portion 112 and causes the air to flow through the adsorber 13. The humidification device blower 12 includes a motor 121 and a centrifugal blower fan 122 connected to a rotating shaft of the motor 121.

The adsorber 13 includes metal plate members on each of which an adsorbent that absorbs and desorbs moisture is supported. The plate members are stacked to be distanced from each other to form ventilation paths, through which the air flows, between the plate members. In the adsorber 13 in the present embodiment, a contact area between the air and the adsorbent is increased by stacking the plate members on which the adsorbent is supported.

As the adsorbent, a polymer adsorbent is employed. Specifically, the adsorbent has such an adsorption property that an amount of adsorbed moisture (i.e., adsorbed amount) changes by 3 wt % to 10 wt % and at least by 3 wt % when relative humidity of the air passing through the adsorber 13 is changed by 50% in a temperature range expected as the temperature of the air.

An adsorption speed adsorbing water is generally about half of a desorption speed desorbing water. A double volume of air is therefore required in the adsorption as compared to an air volume required in the desorption, and the humidification device blower 12 performs correspondingly.

Figure 2:
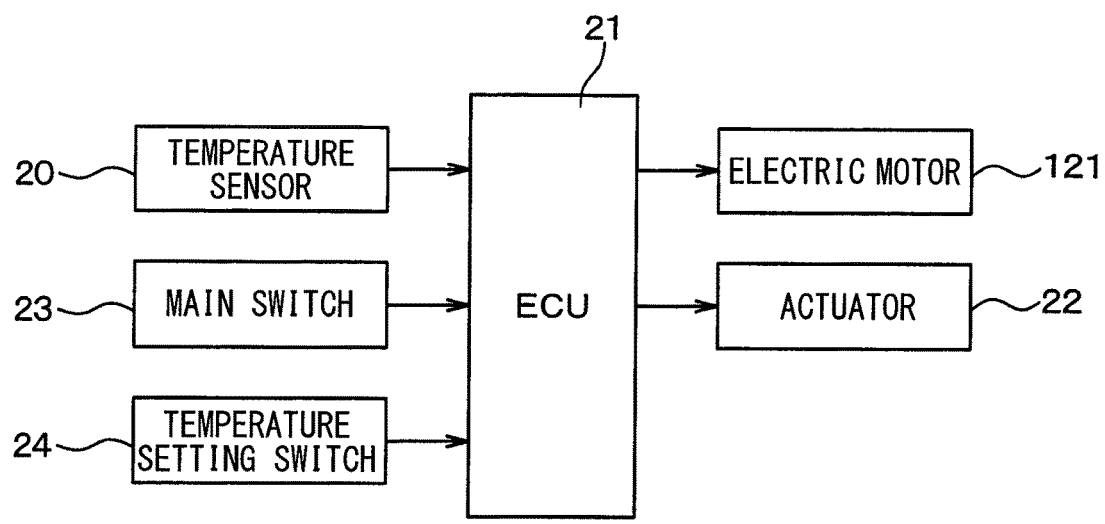
FIG. 2 is a block diagram illustrating a structure of an electric control section of the humidification device according to the embodiment.

As shown in FIG. 2, the humidification device 1 includes a humidification controller 21 as a controller that switches air flow paths in the humidification device case 11 by controlling the doors 14 to 16 of the humidification device 1.

The humidification controller 21 is formed by a known microcomputer including a CPU, a ROM, RAM, and the like and peripheral circuits for the microcomputer and carries out various operations and processing based on control programs stored in the ROM to control actuation of various devices connected to an output side.

To the output side of the humidification controller 21, the motor 121 for the humidification device blower 12 and an actuator 22 that derives the doors 14 to 16 of the humidification device 1 are connected. As the actuator 22, a servomotor may be used.

To an input side of the humidification controller 21, the temperature sensor 20, a main switch 23 that switches on/off the humidification device 1, and a humidified air temperature setting switch 24 that sets a target temperature of the air blown out of the third duct 19 are connected.

Next, actuation of the humidification device 1 will be described.

When the main switch 23 is set to an ON state while the vehicle air conditioner is operating, the humidification controller 21 starts operation of the humidification device blower 12. The humidification controller 21 moves the doors 14 to 16 of the humidification device 1 to predetermined positions to alternately perform a dehumidification mode (i.e., an adsorption mode) and a humidification mode (described later) by the minute.

FIG. 1 shows a state in the dehumidification mode. While the dehumidification mode is being performed, the humidification controller 21 moves the doors 14 to 16 of the humidification device 1 to the predetermined positions to set the flow path for the dehumidification mode that causes the adsorber 13 to adsorb the moisture.

Specifically, as shown in FIG. 1, the opening/closing door 14 opens the first opening portion 111. The first switching door 15 prevents the ventilation path extending from the first opening portion 111 to the adsorber 13 and the second opening portion 112 from communicating each other, and the second opening portion 112 and the communication hole 115 communicate with each other through the first switching door 15. Moreover, the second switching door 16 closes the third opening portion 113 and opens the communication hole 115.

In this state, the low-temperature and high-humidity air (e.g., 5° C. in temperature and 72% in relative humidity) cooled by the evaporator 34 flows from the first opening portion 111 into the humidification device case 11 through the first duct 17 and is led to the adsorber 13 where the moisture of the air is adsorbed by the adsorber 13.

Then, the air after passing through the adsorber 13 flows from the suction port 114 to the second opening portion 112 through the communication hole 115. The air is subsequently returned from the second opening portion 316 of the air conditioning case 31, through the second duct 18, to the portion in the ventilation path 311 on the downstream side of the heater core 35 in the air flow direction. Therefore, the cold air does not leak into the vehicle compartment.

The adsorption speed adsorbing water is generally about half of the desorption speed desorbing water. A volume of air to be supplied to the humidification device 1 in the dehumidification mode is thereby set at a double volume of a volume of air supplied to the humidification device 1 in the humidification mode.

Figure 3:
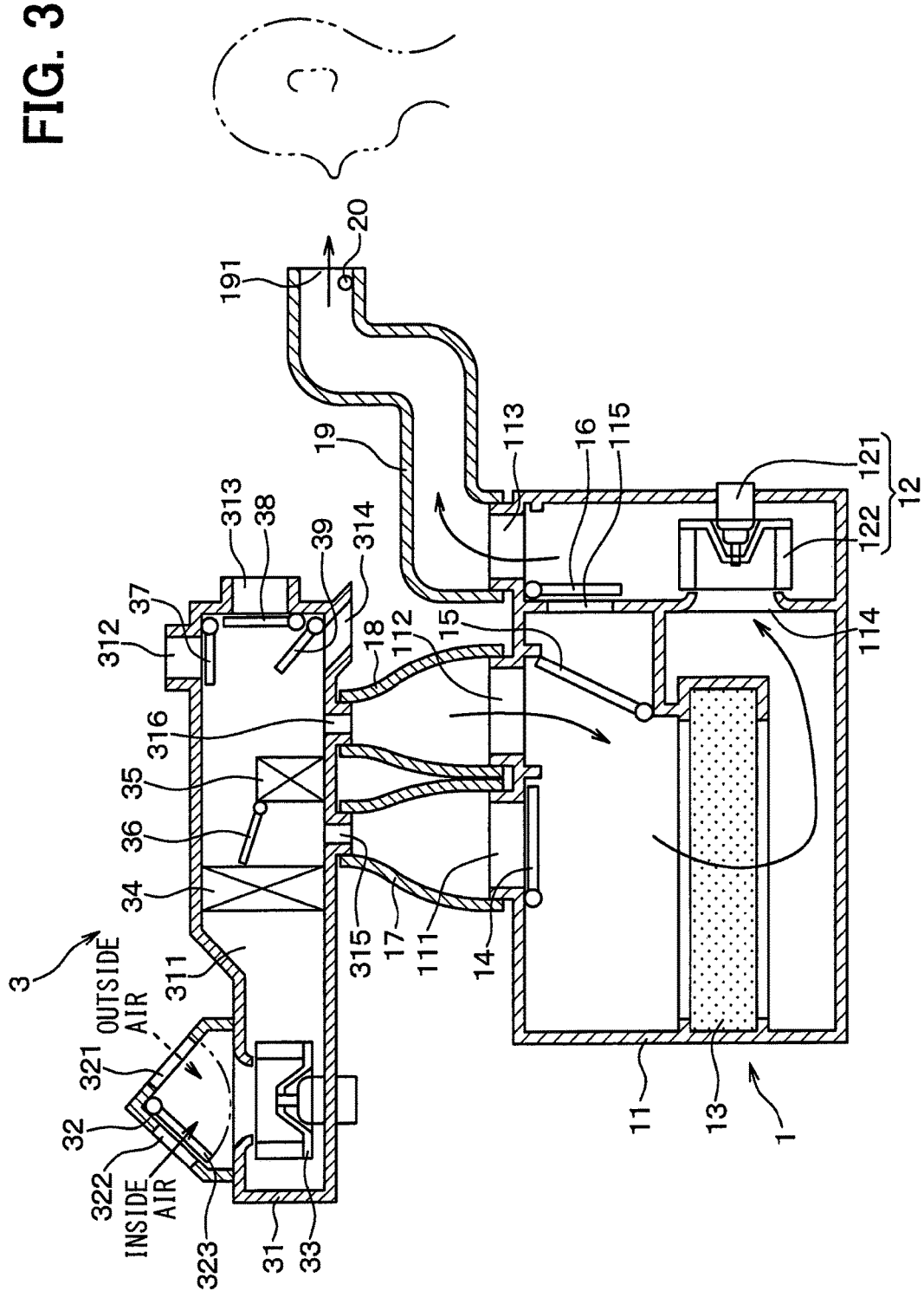
FIG. 3 is a schematic diagram illustrating an example of an operation of a humidification mode of the humidification device according to the embodiment.
Figure 4:
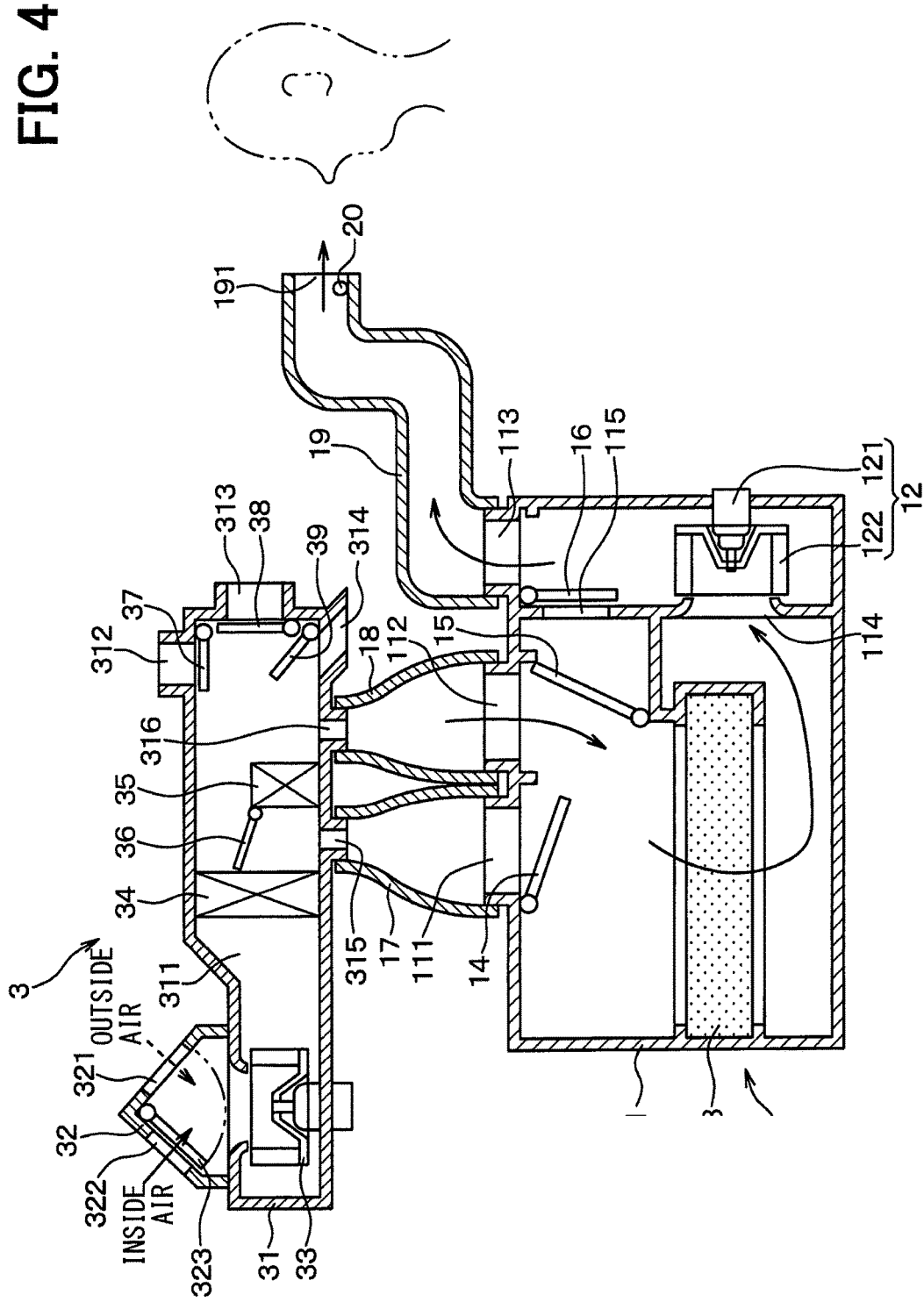
FIG. 4 is a schematic diagram illustrating another example of the operation of the humidification mode of the humidification device according to the embodiment.

FIG. 3 and FIG. 4 show a state in the humidification mode. In the humidification mode, the humidification controller 21 moves the doors 14 to 16 of the humidification device 1 to the predetermined positions to set the flow path for the humidification mode in which the moisture adsorbed by the adsorber 13 moves to low-humidity air.

Specifically, as shown in FIG. 3 and FIG. 4, the opening/closing door 14 closes the first opening portion 111 or opens the first opening portion 111 to an appropriate degree. The first switching door 15 connects the ventilation path from the first opening portion 111 to the adsorber 13 and the second opening portion 112 and disconnects the second opening portion 112 and the communication hole 115 from each other. Moreover, the second switching door 16 opens the third opening portion 113 and closes the communication hole 115.

As shown in FIG. 3, in a state where the opening/closing door 14 closes the first opening portion 111, the high-temperature and low-humidity air heated by the heater core 35 flows from the second opening portion 112 into the humidification device case 11 through the second duct 18 and is led to the adsorber 13. Then, the moisture in the adsorber 13 moves to the high-temperature and low-humidity air (e.g., 70° C. in temperature and 2% in relative humidity) heated by the heater core 35, and the air turns into high-humidity air.

The high-humidity air after passing through the adsorber 13 reaches the third opening portion 113 through the suction port 114 and is blown toward the occupant's face from the blow opening portion 191 through the third duct 19.

The humidified air blown out of the blow opening portion 191 is blown at an air volume of about 10 m$^3$/h so that the air is blown at a wind speed of 1 m/s or lower. In this way, by reducing the wind speed, diffusion of the humidified air can be suppressed, and the humidified air can be secured to reach the face.

Incidentally, the air volume of 10 m$^3$/h is 10% or less of a smallest air volume of the vehicle air conditioner. In this manner, the volume of air supplied to the humidification device 1 is so small as not to substantially affect an air conditioning function of the vehicle air conditioner.

Here, the third duct 19 is about φ50 mm in diameter and about 1000 mm in length. Therefore, the high-temperature and high-humidity air after passing through the adsorber 13 exchanges heat with air in the vehicle compartment around the third duct 19, the temperature of the high-temperature and high-humidity air falls to a temperature close to a temperature in the vehicle compartment, and a humidity of the high-temperature and high-humidity air becomes high (e.g., 55% in relative humidity) when the high-temperature and high-humidity air passes through the third duct 19.

However, in the present embodiment, when the air temperature detected by the temperature sensor 20 is higher than the target temperature set by the humidified air temperature setting switch 24, the opening/closing door 14 is moved in a valve-opening direction to lead the low-temperature air cooled by the evaporator 34 into the humidification device case 11 through the first duct 17 as shown in FIG. 4. In this way, the low-temperature air cooled by the evaporator 34 is mixed with the high-temperature air heated by the heater core 35 to adjust the temperature of the humidified air blown out of the blow opening portion 191 to the target temperature.

The humidification controller 21 stops operation of the humidification device 1 after carrying out the humidification mode so as to prevent the moisture from remaining in the adsorber 13, when the main switch 23 is set to an OFF state.

According to the present embodiment, the moisture is adsorbed by the adsorber 13 from the high-humidity air cooled by the evaporator 34 in the vehicle air conditioner, and the moisture adsorbed by the adsorber 13 is moved to the low-humidity air to humidify the air. In this way, the humidification can be carried out without water supply.

Moreover, only a space around the occupant's face is humidified, and window glass is not humidified, by providing the third duct 19 dedicated for the humidified air to blow the humidified air from the blow opening portion 191 toward the occupant's face. Therefore, fogging of the window glass does not occur.

Furthermore, the diffusion of the humidified air can be suppressed, and the humidified air can be secured to reach the face, by reducing the wind speed of the humidified air blown out of the blow opening portion 191.

The volume of air supplied to the humidification device 1 is so small as not to substantially affect the air conditioning function of the vehicle air conditioner.

The humidification device 1 is a member provided separately from the interior air conditioning unit 3 of the vehicle air conditioner, and thus the humidification device 1 can be mounted in the vehicle air conditioner afterward.

The humidification device 1 is disposed outside the interior air conditioning unit 3 of the vehicle air conditioner, and thus ventilation friction in the interior air conditioning unit 3 can be small as compared to a case where the humidification device 1 is mounted in the interior air conditioning unit 3.

Since the low-temperature air after passing through the adsorber 13 is returned to the ventilation path 311 in the interior air conditioning unit 3 in the dehumidification mode, the cold air does not leak into the vehicle compartment.

(Other Embodiments)

In the above-described embodiment, the adsorption speed of the moisture by the adsorbent is about half the desorption speed. Therefore, an operational duration of the dehumidification mode and an operational duration of the humidification mode are equalized, and the volume of air to be supplied to the humidification device 1 in the dehumidification mode is set to be double as compared to the volume of air to be supplied to the humidification device 1 in the humidification mode. However, the operational duration of the dehumidification mode may be set to be twice as long as the operational duration of the humidification mode, and the volume of air to be supplied to the humidification device 1 while the dehumidification mode is being performed and the volume of air to be supplied to the humidification device 1 while the humidification mode is being performed may be equalized.

Figure 5:
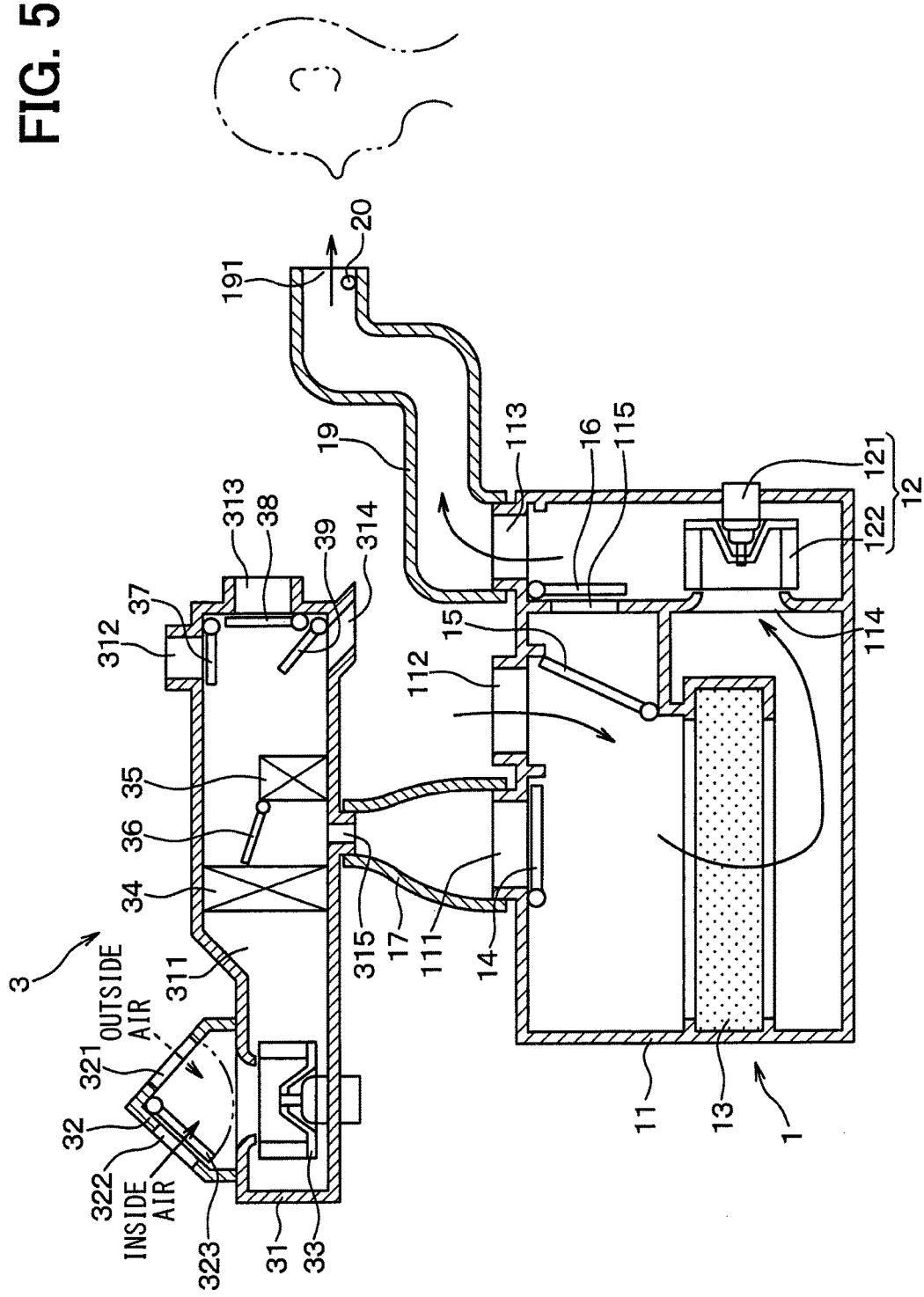
FIG. 5 is a schematic diagram illustrating a variation of the humidification device according to the embodiment.

Moreover, as in a variation shown in FIG. 5, the second duct 18 of the humidification device 1 and the second opening portion 316 of the air conditioning case 31 may be omitted so that air in a vehicle compartment may be caused to directly flow into a humidification device case 11 from a second opening portion 112 of the humidification device case 11 in the humidification mode.

In other words, although the high-temperature and low-humidity air heated by the heater core 35 is led to the adsorber 13 in the humidification mode according to the above-described embodiment, moisture can be easily desorbed from the adsorber 13 in a structure in the variation, because the air in the vehicle compartment is dry when the humidification is required.

The present disclosure is not limited to the above-described embodiment and can be modified within the scope of the present disclosure.

In the above-described embodiment, it is to be understood that elements constituting the embodiments are not necessary except for a case of being explicitly specified to be necessary and a case of being considered to be absolutely necessary in principle.

Even when a factor such as a quantity of elements, a value, an amount, a range is mentioned in the above-described embodiment, it is to be understood that the factor is not limited to a specific value except for a case of being explicitly specified to be necessary and a case of being considered to be absolutely necessary in principle.

Even when a feature such as a material forming a member, a shape of a member, or a positional relation of members, it is to be understood that such feature is not limited to a specific material, shape, positional relation, or the like except for a case of being explicitly specified to be necessary and a case of being considered to be absolutely necessary in principle.

What is claimed is:

1. A humidification device for a vehicle air conditioner, the vehicle air conditioner having a cooler that is disposed in an air conditioning case and cools air, the air conditioning case having a ventilation path leading air into a vehicle compartment, the humidification device comprising:
    an adsorber that absorbs and desorbs moisture;
    a blower that causes air to flow through the adsorber;
    a door that opens or closes an air flow path through which the air flows; and
    a controller that switches the air flow path by controlling the door to set (i) a dehumidification mode in which the air cooled by the cooler is led to the adsorber, and in which moisture in the air is adsorbed by the adsorber or (ii) a humidification mode in which the air is led to the adsorber, the moisture is moved from the adsorber to the air to humidify the air, and the humidified air is blown toward an occupant, wherein
    the ventilation path is branched at a part located downstream of the cooler into (i) a path that leads air to the adsorber and (ii) a path that bypasses the adsorber.

2. The humidification device according to claim 1, wherein
    the air which is led to the adsorber and to which the moisture is moved from the adsorber to humidify the air is low-humidity air.

3. The humidification device according to claim 1, further comprising
    a duct having an opening portion that blows the humidified air toward a face of the occupant.

4. The humidification device according to claim 3, wherein
    the duct is a member provided separately from the air conditioning case.

5. The humidification device according to claim 1, wherein
    the adsorber, the blower, and the door are housed in a case, and the case is a member provided separately from the air conditioning case.

6. The humidification device according to claim 2, wherein
    the controller, in the humidification mode, controls the door to mix the air cooled by the cooler with the low-humidity air to adjust a temperature of the humidified air.

7. The humidification device according to claim 1, wherein
    the controller, in the humidification mode, controls the door to mix the air cooled by the cooler with the air to be led to the adsorber to adjust a temperature of the humidified air.

8. The humidification device according to claim 1, wherein
the air after passing through the adsorber is returned into the ventilation path in the air conditioning case in the dehumidification mode.

9. The humidification device according to claim 1 further comprising:
a case that defines an air passage through which the air flows, the case accommodating the adsorber, the blower, and the door; and
a duct through which the air passage of the casing communicates with the ventilation path of the air conditioning case, wherein
the case includes an opening that opens in the vehicle compartment,
in the dehumidification mode, the air cooled by the cooler is led to the adsorber through the duct, and the moisture in the air is adsorbed by the adsorber, and
in the humidification mode, the air heated by the heater is led to the adsorber, the adsorber after adsorbing the moisture, through the opening, the moisture in the adsorber is moved to the air to humidify the air, and the humidified air is blown toward the occupant.

10. The humidification device according to claim 1 further comprising:
a heater located in the path that bypasses the adsorber, wherein
the air flowing through the path that bypasses the adsorber flows into the vehicle compartment after a temperature of the air is adjusted by the cooler and the heater.

11. A humidification device for a vehicle air conditioner, the vehicle air conditioner having an air conditioning case having (i) a ventilation path leading air into a vehicle compartment, (ii) a cooler that cools the air, and (iii) a heater that heats the air, the humidification device comprising:
an adsorber that absorbs and desorbs moisture in the air;
a blower that causes the air to flow through the cooler, the heater, and the adsorber;
a door that opens or closes an air flow path through which the air flows;
a controller that switches the air flow path by controlling the door to set (i) a dehumidification mode in which the air cooled by the cooler is led to the adsorber, and in which the moisture in the air is adsorbed by the adsorber and (ii) a humidification mode in which the air heated by the heater is led to the adsorber after adsorbing the moisture, the moisture in the adsorber is moved to the air to humidify the air, and the humidified air is blown toward an occupant;
a case having a ventilation path through which the air is caused to flow, the case houses the adsorber, the blower, and the door;
a first duct that connects the ventilation path in the case and the ventilation path in the air conditioning case to each other; and
a second duct that connects the ventilation path in the case and the ventilation path in the air conditioning case to each other, wherein
the air cooled by the cooler is led to the adsorber through the first duct, and the moisture in the air is adsorbed by the adsorber in the dehumidification mode, and
the air heated by the heater is led to the adsorber, the adsorber after adsorbing the moisture, through the second duct, the moisture in the adsorber is moved to the air to humidify the air, and the humidified air is blown toward the occupant in the humidification mode.

12. The humidification device according to claim 11, wherein
the controller, in the humidification mode, controls the door to mix the air cooled by the cooler with the air heated by the heater to adjust a temperature of the air.

13. The humidification device according to claim 11, wherein
the air after passing through the adsorber is returned into the ventilation path in the air conditioning case in the dehumidification mode.

\* \* \* \* \*